(12) United States Patent
Munson et al.

(10) Patent No.: US 6,379,626 B1
(45) Date of Patent: Apr. 30, 2002

(54) REACTOR PLATE CLAMPING SYSTEM

(75) Inventors: Mark Munson, Louisville; Adam Cook, Longmont; Philip Loudin, Boulder, all of CO (US)

(73) Assignee: Array BioPharma, Boulder, CO (US)

( * ) Notice: Subject to any disclaimer, the term of this patent is extended or adjusted under 35 U.S.C. 154(b) by 0 days.

(21) Appl. No.: 09/390,252

(22) Filed: Sep. 3, 1999

(51) Int. Cl.$^7$ .................................................. B01L 9/00
(52) U.S. Cl. ........................ 422/102; 422/104; 422/129; 435/288.4
(58) Field of Search .......................... 422/99, 101, 102, 422/103, 104, 129, 242; 210/258, 261, 321.75, 474; 435/288.4

(56) References Cited

U.S. PATENT DOCUMENTS

| | | | |
|---|---|---|---|
| 4,390,111 A | 6/1983 | Robbins et al. | 220/259 |
| 4,444,598 A | 4/1984 | Sakagami | 134/22.12 |
| 4,639,242 A | 1/1987 | Babson | 494/37 |
| 4,755,356 A | 7/1988 | Robbins et al. | 422/102 |
| 4,931,400 A | 6/1990 | Jitwukawa | 435/287 |
| 5,079,141 A | 1/1992 | Niskanen et al. | 435/7.34 |
| 5,120,503 A | 6/1992 | Hinckley et al. | 422/102 |
| 5,350,458 A | 9/1994 | Pinsl-Ober et al. | 134/22.1 |
| 5,380,662 A | 1/1995 | Robbins et al. | 435/312 |
| 5,564,826 A | 10/1996 | Neumann et al. | 366/219 |
| 5,669,638 A | 9/1997 | Anderson et al. | 292/111 |
| 5,803,987 A | 9/1998 | DeWitt et al. | 134/25.4 |
| 5,814,277 A | 9/1998 | Bell et al. | 422/67 |
| 5,840,253 A | 11/1998 | Chase et al. | 422/63 |
| 5,843,385 A | 12/1998 | Dugan | 422/191 |
| 5,885,529 A | 3/1999 | Babson et al. | 422/65 |
| 5,885,530 A | 3/1999 | Babson et al. | 422/65 |
| 5,916,526 A | 6/1999 | Robbins | 422/102 |
| 6,054,100 A * | 4/2000 | Stanchfield et al. | 422/102 |
| 6,159,368 A * | 12/2000 | Moring et al. | 422/101 |
| 6,258,088 B1 * | 7/2001 | Sanadi et al. | 422/101 |
| 6,274,088 B1 * | 8/2001 | Burbaum et al. | 422/101 |

OTHER PUBLICATIONS

Robbins Scientific Corporation, FlexChem™ Organic Synthesis System catalog dated 3/98, pp. 1–6.

* cited by examiner

*Primary Examiner*—Joseph W. Drodge
(74) *Attorney, Agent, or Firm*—McDonnell Boehnen Hulbert & Berghoff (57) ABSTRACT

A clamping system including a cover plate with an underside having at least one step, and a bottom plate having a base connected to a first side, a second side, a third side, and a fourth side. The bottom plate also has a well for receiving a reactor plate. The clamping system further includes a compression skirt positioned between the cover plate and the bottom plate, with the compression skirt having a first side, a second side, a third side, and a fourth side corresponding to the first, second, third, and fourth sides of the bottom plate, respectively. Additionally, the clamping system includes a first and a second upper latch assembly for clamping the cover plate to the compression skirt, and a first and a second lower latch assembly for clamping the compression skirt to the bottom plate.

33 Claims, 9 Drawing Sheets

REACTOR PLATE CLAMPING SYSTEM

FIELD OF INVENTION

The present invention relates to clamping systems for reactor plates. More specifically, it relates to a three-part clamping system for a chemical reactor plate with multiple wells.

BACKGROUND OF THE INVENTION

Multiple well reactor plates are commonly used for conducting and studying chemical reactions and experiments. Typically, these reactor plates are open on both the top and bottom surfaces to facilitate filing of the wells and removal of end products and unreacted constituents after the chemical reaction has been completed. Therefore, it is necessary to seal the top and bottom openings while the chemical reactions and other process steps take place.

Clamping or sealing systems have been developed to assist with the clamping and sealing of the top and bottom openings of the prior art reactor plates during chemical reactions and experiments. One such sealing system is manufactured by Robbins Scientific in Sunnyvale, Calif. The Robbins sealing system includes top and bottom sealing covers, each with a sealing gasket and six clamps. The Robbins sealing system also includes top and bottom clamping collars that are screwed together around a reactor plate with a threaded fastener, and that are capable of being clamped to the top and bottom sealing covers via the twelve clamps.

While the Robbins sealing system provides a seal for the top and bottom openings of the reactor plate, the Robbins sealing system is relatively expensive, inefficient, complex, and bulky. The multiple components of the Robbins sealing system make it expensive, and the threaded fastener and twelve clamps make it inefficient and complex to use. In addition, the threaded fastener and twelve clamps of the Robbins sealing system make it bulky and difficult to use with other clamping or sealing systems in a relatively small amount of space, such as an oven cavity.

Accordingly, it would be desirable to have a clamping system that provides a relatively inexpensive, efficient, simple, and minimally-sized clamping system for chemical reactor plates.

SUMMARY OF THE INVENTION

The present invention provides a clamping system comprising a cover plate and a bottom plate having a base and a plurality of sides defining a well for receiving a reactor plate. The clamping system also comprises a compression skirt positioned between the cover plate and the bottom plate. In addition, the clamping system comprises at least one upper latch assembly for clamping the cover plate to the compression skirt, and at least one lower latch assembly for clamping the compression skirt to the bottom plate.

The present invention further provides a clamping system comprising a cover plate with an underside having at least one step, and a bottom plate having a base connected to a first side, a second side, a third side, and a fourth side. The bottom plate also has a well for receiving a reactor plate. The clamping system also comprises a compression skirt positioned between the cover plate and the bottom plate, with the compression skirt having a first side, a second side, a third side, and a fourth side corresponding to the first, second, third, and fourth sides of the bottom plate, respectively. Additionally, the clamping system comprises a first and a second upper latch assembly for clamping the cover plate to the compression skirt, and a first and a second lower latch assembly for clamping the compression skirt to the bottom plate.

The present invention also provides, in combination with a reactor plate having a flange between an inlet section and an outlet section, a clamping system comprising a cover plate positioned adjacent the inlet section of the reactor plate, and a bottom plate having a base and a plurality of sides defining a well for receiving the outlet section and at least a portion of the flange of the reactor plate. The clamping system further comprises a compression skirt positioned between the cover plate and the bottom plate, with the compression skirt also being disposed on at least a portion of the flange and around the inlet section of the reactor plate. Moreover, the clamping system comprises at least one upper latch assembly for clamping the cover plate to the compression skirt, and at least one lower latch assembly for clamping the reactor plate between the compression skirt and the bottom plate.

DETAILED DESCRIPTION OF PREFERRED EMBODIMENTS

Turning now to the drawings, FIGS. 1–4 show a preferred embodiment of a clamping system 5 of the present invention for retaining a reactor plate 10. The clamping system 5 comprises a bottom plate 20, a compression skirt 40, a cover plate 60, a first and a second lower latch assemblies 80a, 80b, and a first and a second upper latch assemblies 80c, 80d. Preferably, the bottom plate 20, the compression skirt 40, and the cover plate 60 are made of anodized aluminum. Alternatively, however, the bottom plate 20, the compression skirt 40, and the cover plate 60 may be made of another corrosion resistant metal or plated steel, such as stainless steel. It should also be understood that the clamping system 5 of the present invention may include more or less components, with any desirable configuration or shape, than what is shown in FIGS. 1–4, depending upon manufacturing and/or consumer preferences.

Figure 2:
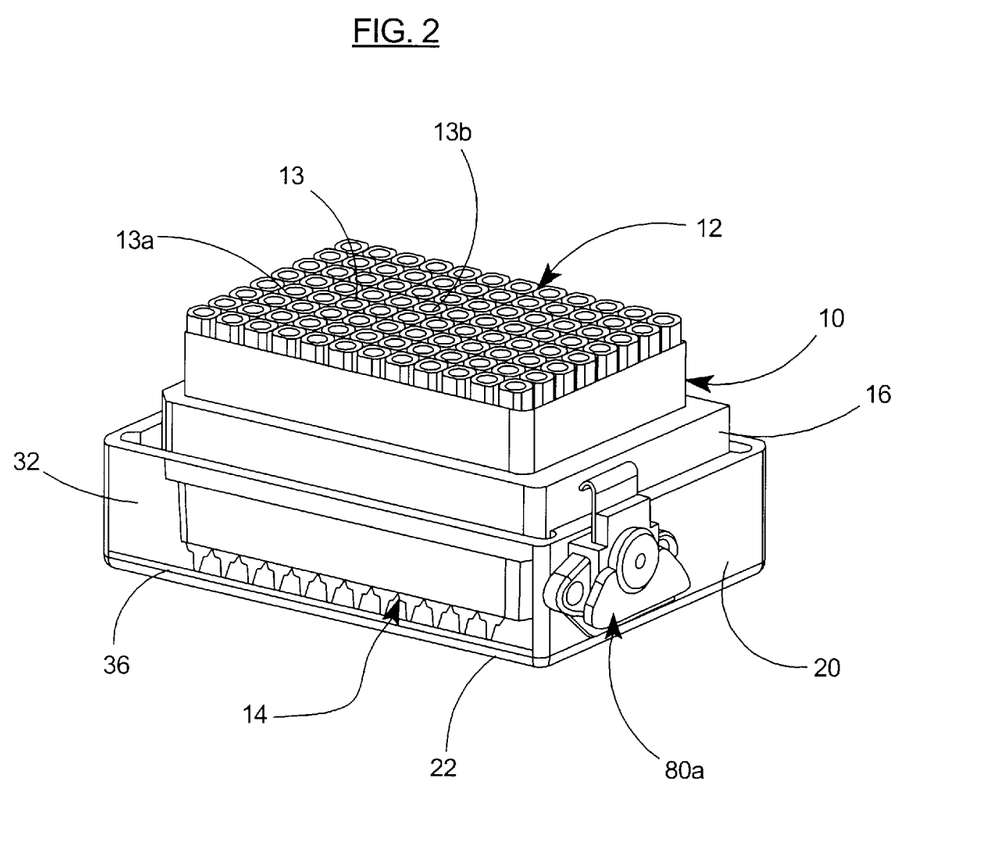
FIG. 2 is a top side perspective view of a reactor plate in a bottom plate of the clamping system of FIG. 1.

As shown in FIG. 2, the reactor plate 10 has an inlet section 12 for adding chemical constituents to the reactor plate, an outlet section 14 for removing chemical constituents from the reactor plate, and a flange 16 between the inlet and outlet sections. The inlet section 12 of the reactor plate 10 may have a surface 13 that gradually decreases from an outer portion 13a to a center portion 13b. In other words, the surface 13 may not be level. Preferably, but not necessarily, the reactor plate 10 is made from a plastic material, such as polypropylene. An example of a reactor plate suitable for use with the clamping system of the present invention is the 96 Well FlexChem Synthesis Reactor, which is manufactured by Robbins Scientific Corporation, located in Sunnyvale, Calif. It should be understood, however, that other reactor plates may be readily used with the clamping system of the present invention.

The bottom plate 20 includes a base 22 connected to a first side 24, a second side 26, a third side 28, and a fourth side 30. The first, second, third, and fourth sides 24, 26, 28, 30, together with the base 22, form and define a well 32 for receiving the outlet section 14 and at least a portion of the flange 16 of the reactor plate 10, as shown in FIG. 2. Preferably, the first, second, third, and fourth sides 24, 26, 28, 30 of the bottom plate 20 each have a support ledge 34 for supporting the flange 16 of the reactor plate 10.

Figure 1:
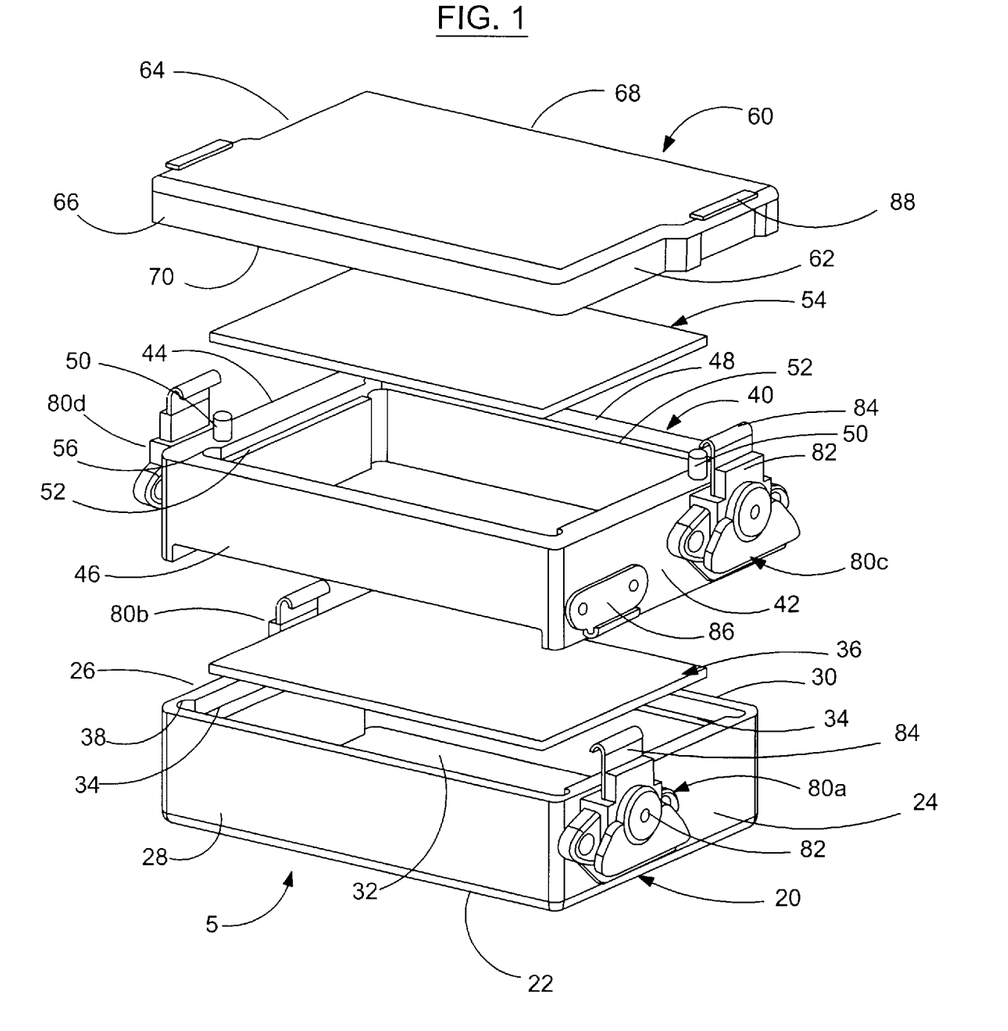
FIG. 1 is a top side exploded view of a preferred embodiment of a clamping system of the present invention.

As shown in FIGS. 1–2, a lower gasket 36 is preferably positioned in the well 32 against the base 22 of the bottom plate 20, between the base 22 and the outlet section 14 of the reactor plate 10. Preferably, the lower gasket 36 is made of santoprene. Alternatively, the lower gasket 36 may be made from another chemically inert elastomeric material, such as polyethylene or polypropylene, that is resistant to attacks from chemical constituents. In order to allow for and facilitate removal of the lower gasket 36 out of the well 32, the bottom plate 20 may have one or more grooves 38 in its corners, as shown in FIG. 1.

Figure 3:
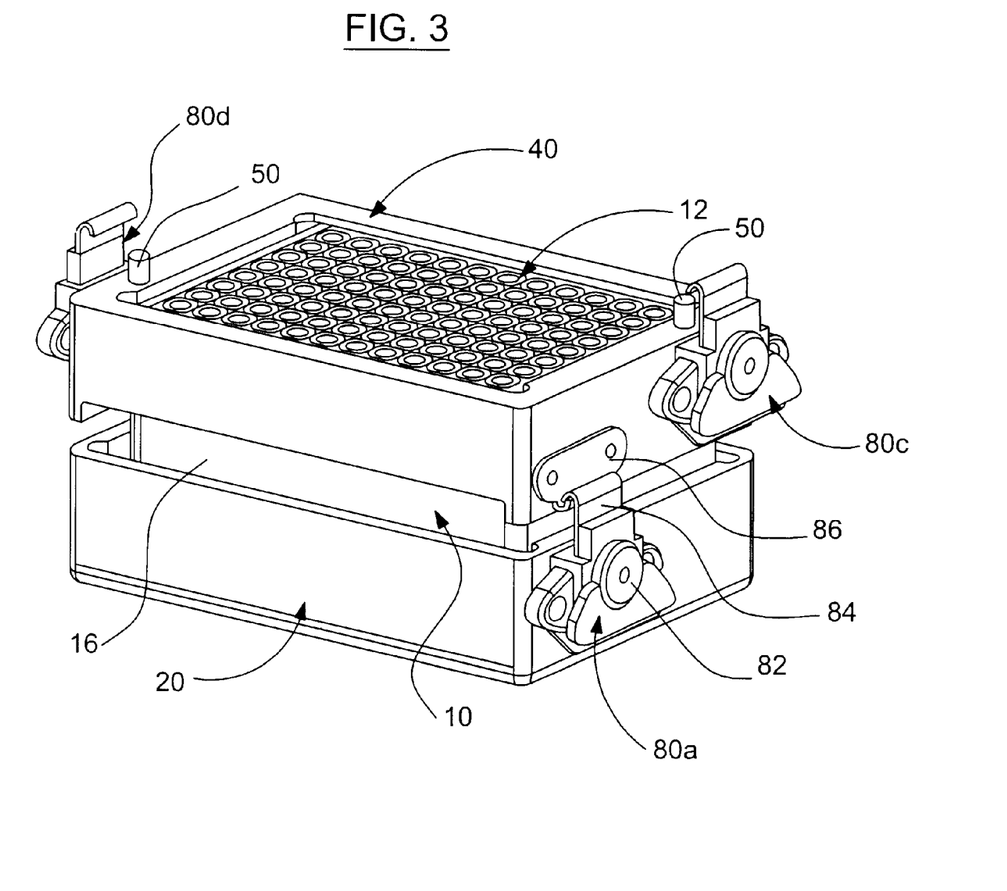
FIG. 3 is a top side perspective view of a reactor plate between a bottom plate and a compression skirt of the clamping system of FIG. 1.

The compression skirt 40 has a first side 42, a second side 44, a third side 46, and a fourth side 48, corresponding to the first, second, third, and fourth sides 24, 26, 28, 30, respectively, of the bottom plate 20. The compression skirt is positioned between the bottom plate 20 and the cover plate 60. The compression skirt is also disposed on at least a portion of the flange and around the inlet section of the reactor plate, as shown in FIG. 3. Preferably, the compression skirt 40 also has one or more alignment pins 50 for aligning the compression skirt 40 with the cover plate 60.

The first, second, third, and fourth sides 42, 44, 46, 48 of the compression skirt 40 preferably each have a support ledge 52 for supporting at least a portion of an upper gasket 54. Each support ledge 52 of the first, second, third, and fourth sides 42, 44, 46, 48 of the compression skirt 40 also serves to align the upper gasket with the inlet section 12 of the reactor plate 10. Like the lower gasket 36, the upper gasket 54 is preferably made of santoprene. Alternatively, the upper gasket 54 may be made from another chemically inert elastomeric material, such as polyethylene or polypropylene, that is resistant to attacks from chemical constituents. In order to allow for and facilitate removal of the upper gasket 54 out of the compression skirt 40, similar to the bottom plate 20, the compression skirt 40 may have one or more grooves 56 in its corners, as shown in FIG. 1.

Figure 4:
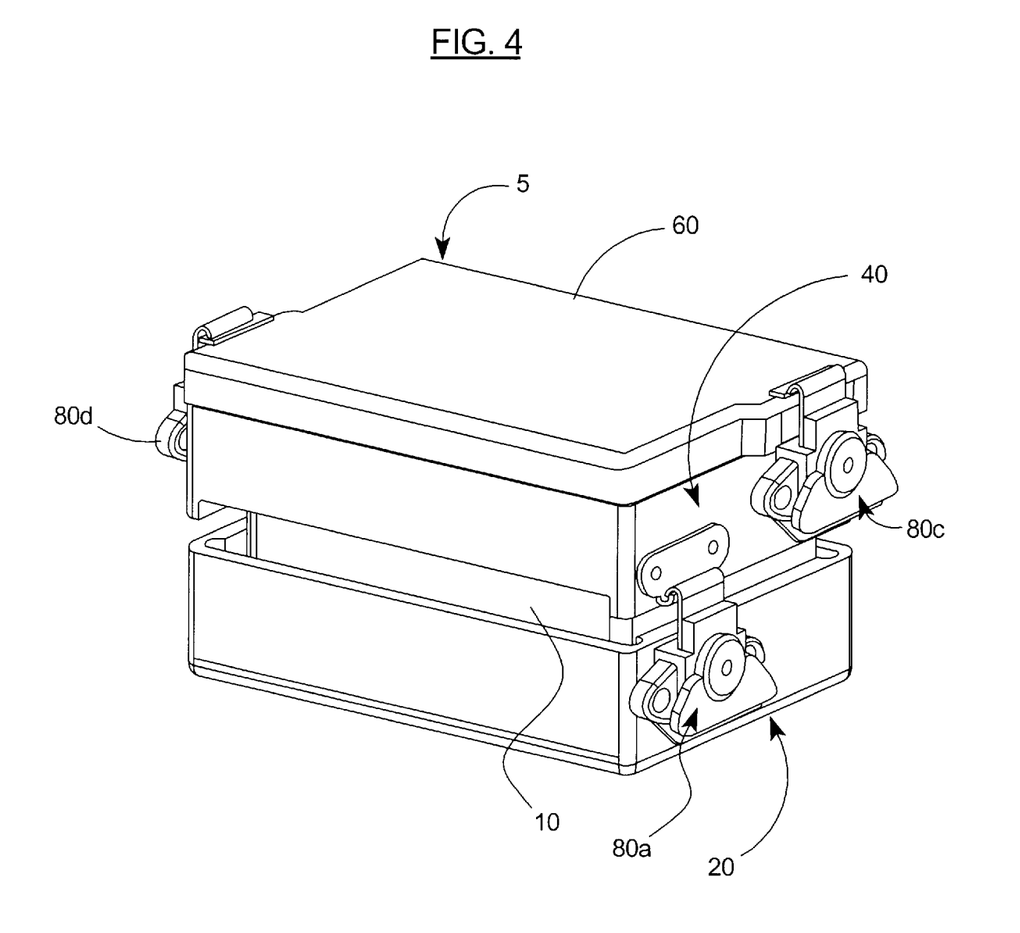
FIG. 4 is a top side perspective view of the clamping system of FIG. 1.
Figure 5:
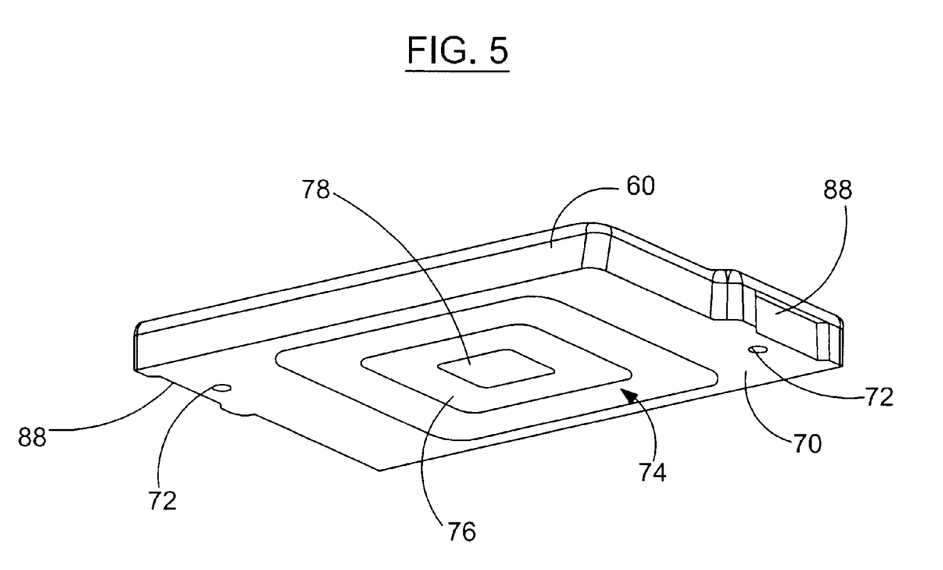
FIG. 5 is a bottom side perspective view of a cover plate of the clamping system of FIG. 1.
Figure 6:
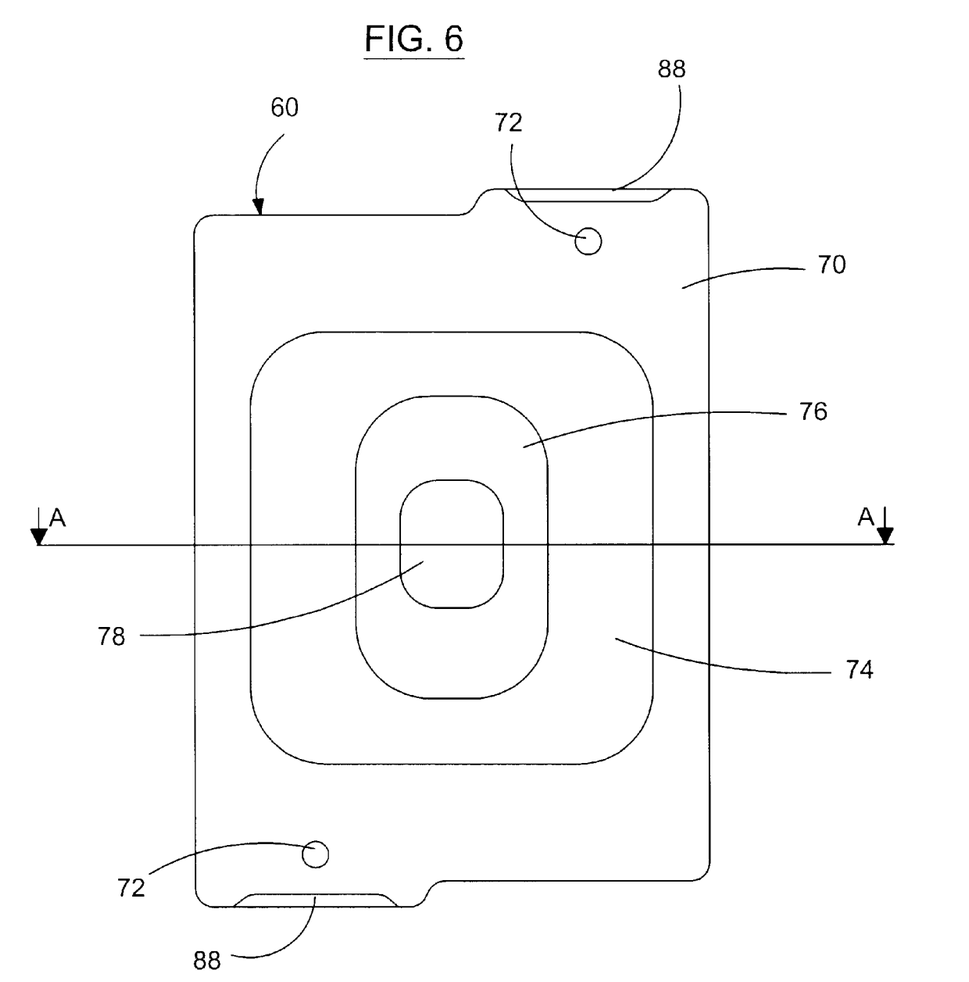
FIG. 6 is a bottom view of the cover plate of FIG. 5.
Figure 7:
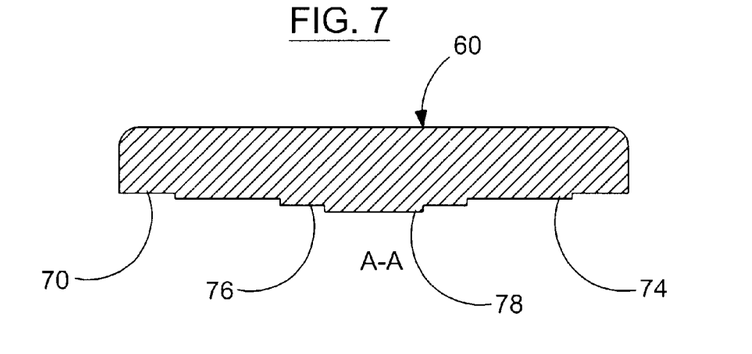
FIG. 7 is a cross-sectional view of the cover plate of FIG. 6 taken along line A—A.

As shown in FIGS. 1 and 4, the cover plate 60 has a first side 62, a second side 64, a third side 66, and a fourth side 68, corresponding to the first, second, third, and fourth sides 42, 44, 46, 48 of the compression skirt 40, and the first, second, third, and fourth sides 24, 26, 28, 30, of the bottom plate 20, respectively. The cover plate 60 also has an underside 70 facing the upper gasket 54. As shown in FIGS. 5–7, the underside 70 of the cover plate 60 has one or more receiving holes 72 for receiving the alignment pins 50 of the compression skirt 40. The underside 70 also preferably has a first step 74, a second step 76, and a third step 78 extending outward away from the underside 70 toward the inlet section 12 of the reactor plate 10. As best shown in FIG. 7, the second step 76 is positioned on the first step 74, and the third step 78 is positioned on the second step 76. This arrangement results in the underside 70 of the cover plate 60 having a pyramidal (convex) shape, increasing in height from the first step 74 to the third step 78. Preferably, the pyramidal-shaped step configuration of the underside 70 of the cover plate 60 corresponds to and closely matches the uneven surface 13 of the reactor plate 10.

Preferably, but not necessarily, the first and second lower latch assemblies 80a, 80b and the first and second upper latch assemblies 80c, 80d are well-known rotary latch assemblies. For more information on rotary action latch assemblies, see U.S. Pat. No. 5,669,638 to Anderson et al., entitled "Fastening Device," and specifically incorporated in its entirety herein by reference. Each latch assembly 80a, 80b, 80c, and 80d includes a fastener 82 with a slide member 84, and either a keeper member 86 or a receptacle member 88 for receiving the slide member 84. The keeper member 86 and/or the receptacle member 88 may be attached to their corresponding components with a fastening device, such as a screw, bolt, rivet, weld, or snap fit mechanism. Alternatively, the keeper member 86 and/or the receptacle member 88 may be formed integral with their corresponding components through injection molding or the like.

Preferably, the lower latch assemblies 80a, 80b each have a keeper member 86 attached to the compression skirt 40 with a fastening device, and the upper latch assemblies 80c, 80d each have a receptacle member 88 formed integral with the cover plate 60, as shown in FIG. 1. It should be understood, however, that each latch assembly 80a, 80b, 80c, 80d may include either a keeper member 86 or a receptacle member 88, and the clamping system 5 of the present invention should not be limited exclusively to the latch assemblies shown in the drawings or described herein.

As shown in FIG. 1, the fastener 82 of the first lower latch assembly 80a is preferably positioned on the first side 24 near the third side 28 of the bottom plate 20, with the corresponding keeper member 86 of the first lower latch assembly 80a being positioned on the first side 42 near the third side 46 of the compression skirt 40. The fastener 82 of the second lower latch assembly 80b is preferably positioned on the second side 26 near the fourth side 28 of the bottom plate 20, with the corresponding keeper member 86 of the second lower latch assembly 80b being positioned on the second side 44 near the fourth side 48 of the compression skirt 40. The fastener 82 of the first upper latch assembly 80c is preferably positioned on the first side 42 near the fourth side 48 of the compression skirt 40, with the corresponding receptacle member 88 of the first upper latch assembly 80c being positioned on the first side 62 near the fourth side 68 of the cover plate 60. The fastener 82 of the second upper latch assembly 80d is preferably positioned on the second side 44 near the third side 46 of the compression skirt 40, with the corresponding receptacle member 88 of the second upper latch assembly 80d being positioned on the second side 64 near the third side 66 of the cover plate 60.

Figure 8:
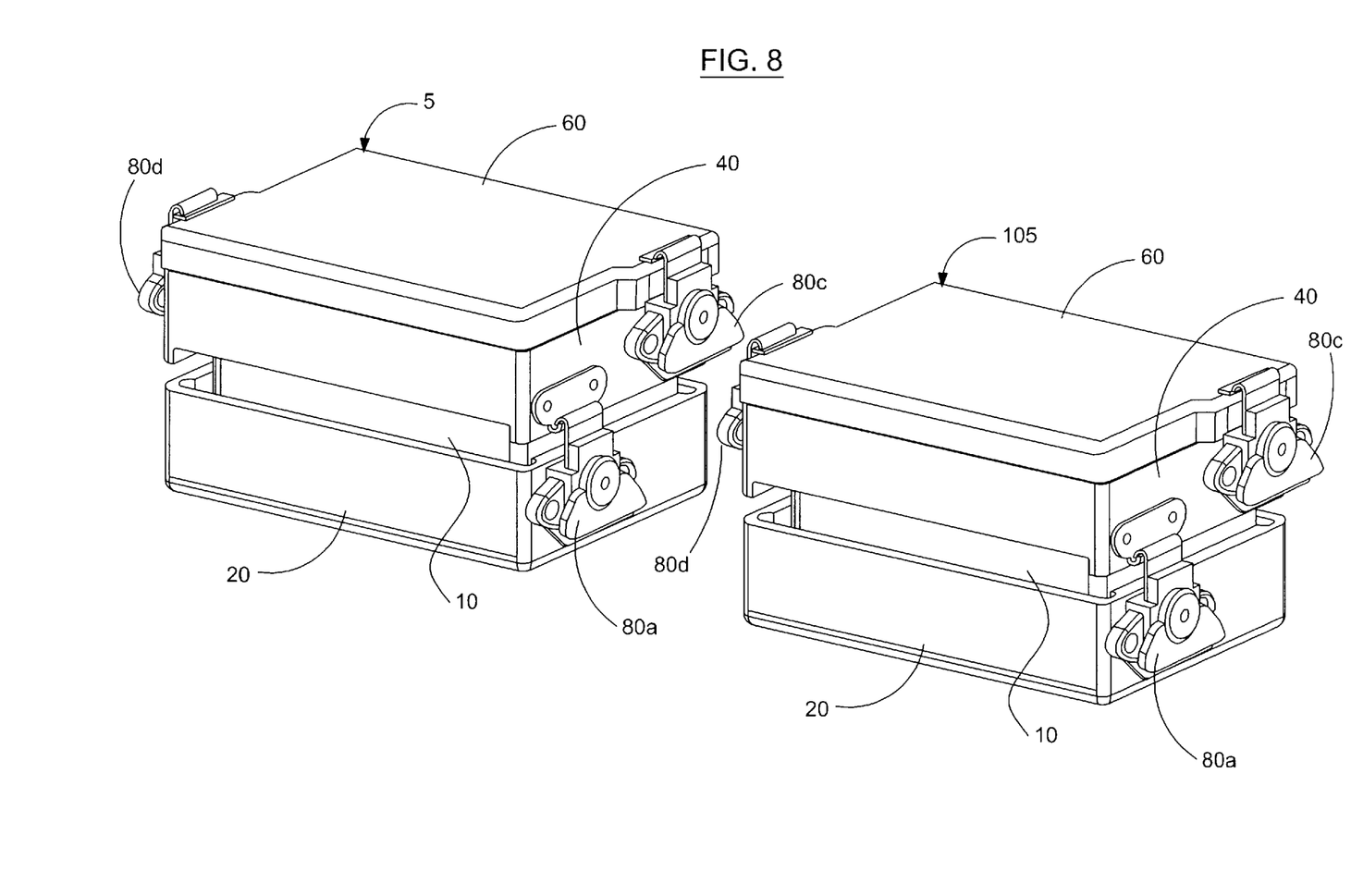
FIG. 8 is a top side perspective view of two identical clamping systems of FIG. 1 in an end-to-end relationship.
Figure 9:
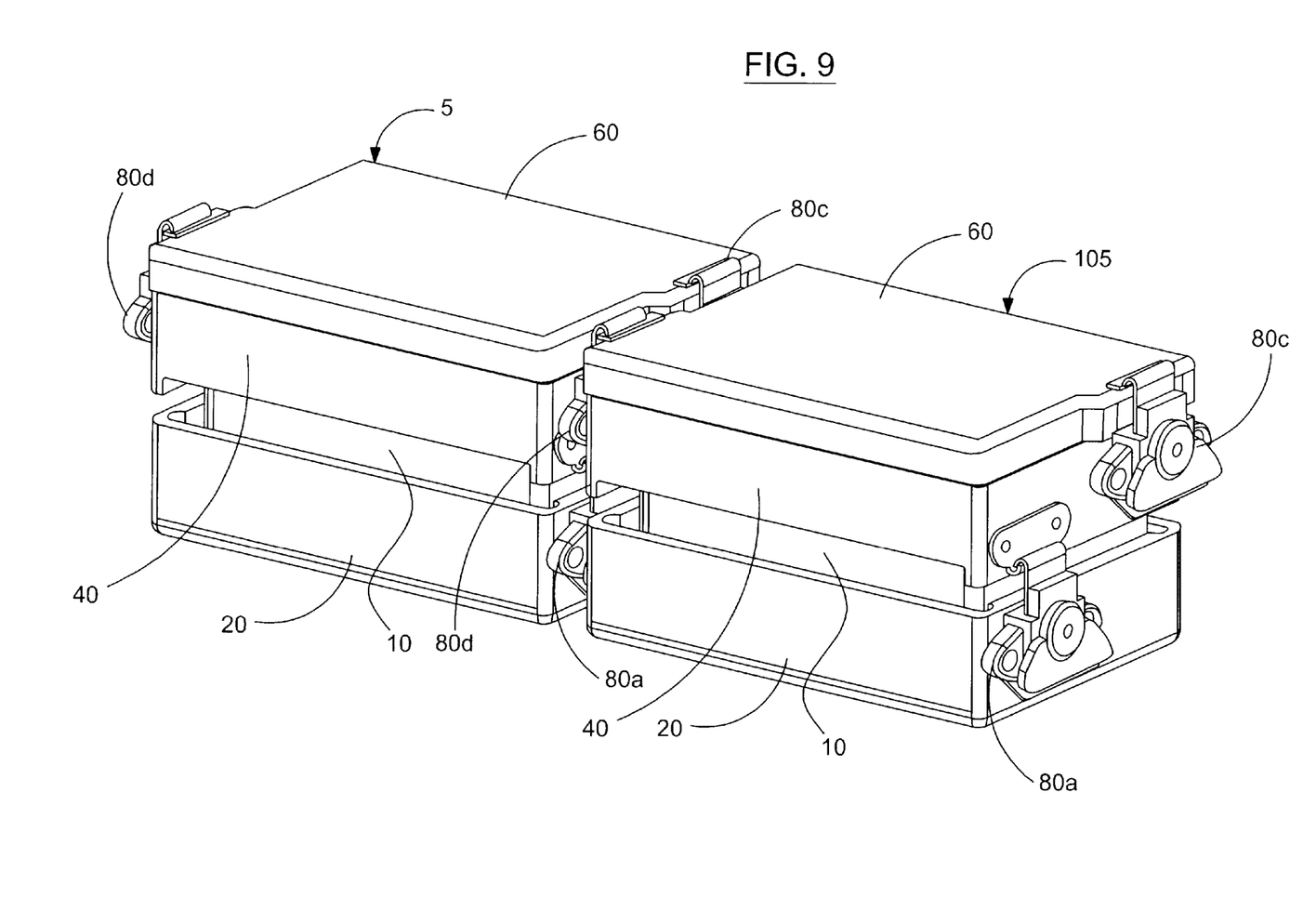
FIG. 9 is a top side perspective view of the two identical clamping systems of FIG. 8 in an adjacent end-to-end relationship.
Figure 10A:
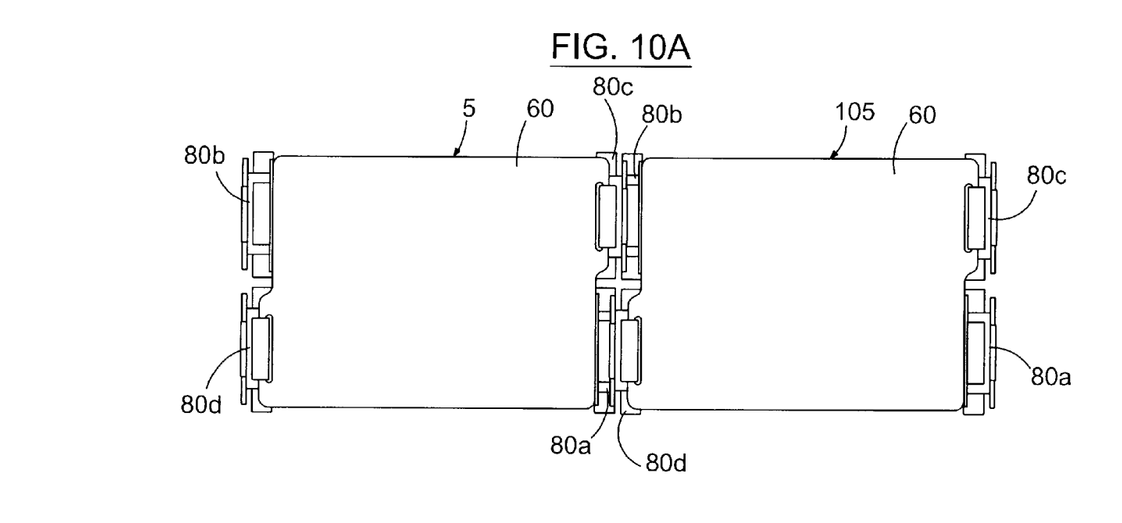
FIGS. 10A–B are top and side views, respectively, of the two identical clamping systems of FIG. 9.
Figure 10B:
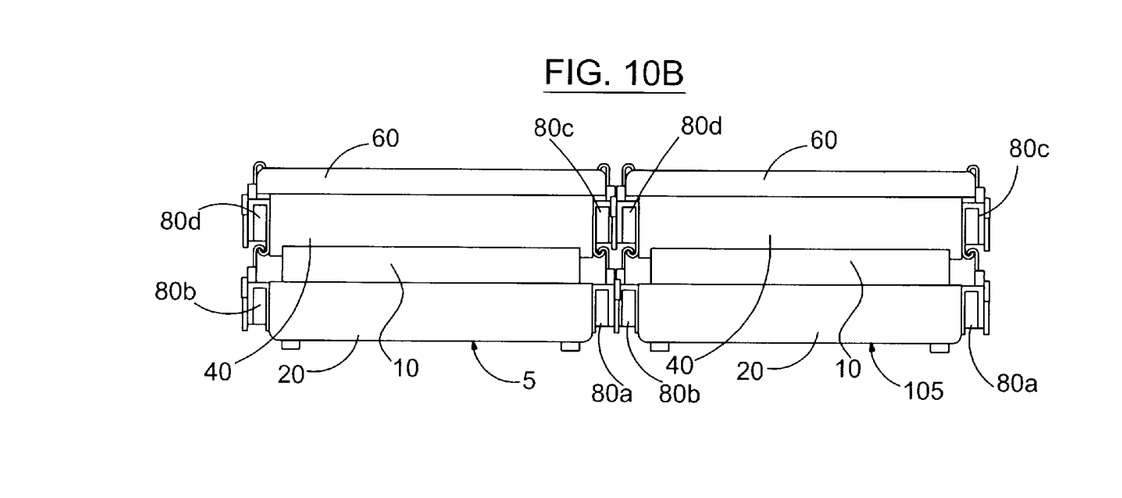

As a result of this preferred staggered arrangement for the lower and upper latch assemblies 80a, 80b, 80c, 80d, two identical clamping systems 5, 105 of the present invention placed in an end-to-end relationship, as shown in FIG. 8, may be nested and closely positioned next to one another in an adjacent end-to-end relationship, as shown in FIGS. 9 and 10A–B. In addition, since there are preferably no latch assemblies on the third sides 28, 46, 66 or the fourth sides 30, 48, 68 of the bottom plate 20, the compression skirt 40, and the cover plate 60, respectively, two identical clamping systems of the present invention may also be closely positioned next to one another in a side-by-side relationship. Unlike conventional clamping systems of the prior art, this nesting and close positioning of clamping systems of the present invention allows multiple clamping systems to advantageously be stored in a minimal amount of space, such as an oven cavity.

The operation of the clamping system 5 of the present invention will now be described with reference to FIGS. 1–4. The lower gasket is placed into the well and against the base of the bottom plate. As shown in FIG. 2, the outlet section of the reactor plate is then positioned in the well of the bottom plate and against the lower gasket, with the flange of the reactor plate resting on the support ledges of the sides of the bottom plate. Next, the compression skirt is placed over and around the inlet section of the reactor plate, and onto the flange of the reactor plate, as shown in FIG. 3. The fasteners of the first and second lower latch assemblies are then rotated to clamp the slide members onto the keeper members of the first and second lower latch assemblies. As a result, the compression skirt is clamped onto the bottom plate, with the reactor plate being clamped and held between the compression skirt and the bottom plate. The clamping of the compression skirt onto the bottom plate also causes the outlet section of the reactor plate to be forced against and sealed off by the lower gasket.

Next, the upper gasket is positioned over the inlet section of the reactor plate and onto the support ledge of the compression skirt. As shown in FIG. 4, the cover plate is then positioned over the upper gasket and onto the compression skirt, with the receiving holes of the cover plate receiving the alignment pins of the compression skirt. The fasteners of the first and second upper latch assemblies are then rotated to clamp the slide members onto the receptacle members of the first and second upper latch assemblies. As a result, the cover plate is clamped onto the compression skirt, with the inlet section of the reactor plate being forced against and sealed off by the upper gasket. The pyramidal-shaped step configuration of the underside of the cover plate provides a tight seal between the upper gasket and the surface of inlet section of the reactor plate, especially between the upper gasket and the center portion of the surface of the inlet section, which is preferably aligned with the steps of the underside of the cover plate. This arrangement is particularly useful when the center portion of the surface of the inlet section of the reactor plate does not extend outward as far as the outer portion of the surface of the inlet section of the reactor plate (i.e., the surface of the inlet section may not be level).

While the clamping system of the present invention may be applied with particular advantage to 96 well reactor plates with uneven inlet sections, the clamping system of the present invention may also be used with other reactor plates of different shapes, sizes, and configurations. It should also be readily apparent from the foregoing description and accompanying drawings that the clamping system of the present invention is an improvement over the prior art. In particular, the clamping system of the present invention provides an inexpensive, sturdy, durable, efficient, tight-sealing, simple, easy to use, and minimally-sized clamping system for chemical reactor plates.

Those skilled in the art to which the invention pertains may make modifications and other embodiments employing the principles of this invention without departing from its spirit or essential characteristics, particularly considering the foregoing teachings. Accordingly, the described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials, and the like would be apparent to those skilled in the art, yet would still fall within the scope of the invention.

What is claimed is:

1. A clamping system comprising:
   a cover plate;
   a bottom plate having a base and a plurality of sides defining a well for receiving a reactor plate;
   a compression skirt positioned between the cover plate and the bottom plate;
   at least one upper latch assembly configured for clamping the cover plate onto the compression skirt; and
   at least one lower latch assembly configured for clamping the compression skirt onto the bottom plate.

2. The clamping system of claim 1 wherein the bottom plate has a support ledge for supporting a flange of a reactor plate.

3. The clamping system of claim 1 further comprising a gasket positioned in the well against the base of the bottom plate.

4. The clamping system of claim 1 wherein the cover plate has an underside with at least one step.

5. The clamping system of claim 4 wherein the underside includes a first step, a second step positioned on the first step, and a third step positioned on the second step.

6. The clamping system of claim 4 further comprising a gasket positioned against the underside of the cover plate.

7. The clamping system of claim 4 further comprising a first gasket positioned against the underside of the cover plate, and a second gasket positioned in the well against the base of the bottom plate.

8. The clamping system of claim 1 wherein there are two upper latch assemblies and two lower latch assemblies.

9. The clamping system of claim 1 wherein the compression skirt has a support ledge for supporting a gasket.

10. The clamping system of claim 1 wherein the compression skirt has at least one alignment pin, and the cover plate has at least one receiving hole for receiving the alignment pin.

11. The clamping system of claim 1 wherein at least one of the latch assemblies is a rotary action latch assembly.

12. A clamping system comprising:
   a cover plate with an underside having at least one step;
   a bottom plate having a base connected to a first side, a second side, a third side, and a fourth side, the bottom plate also having a well for receiving a reactor plate;
   a compression skirt positioned between the cover plate and the bottom plate, the compression skirt having a first side, a second side, a third side, and a fourth side corresponding to the first, second, third, and fourth sides of the bottom plate, respectively;
   a first and a second upper latch assembly configured for clamping the cover plate onto the compression skirt; and
   a first and a second lower latch assembly configured for clamping the compression skirt onto the bottom plate.

13. The clamping system of claim 12 wherein the bottom plate has a support ledge for supporting a flange of a reactor plate.

14. The clamping system of claim 12 wherein the underside includes a first step, a second step positioned on the first step, and a third step positioned on the second step.

15. The clamping system of claim 12 further comprising a gasket positioned in the well against the base of the bottom plate.

16. The clamping system of claim 12 further comprising a gasket positioned against the underside of the cover plate.

17. The clamping system of claim 12 further comprising a first gasket positioned against the underside of the cover plate, and a second gasket positioned in the well against the base of the bottom plate.

18. The clamping system of claim 12 wherein the first lower latch assembly is positioned on the first sides of the bottom plate and the compression skirt near the third sides of the bottom plate and the compression skirt, and the second lower latch assembly is positioned on the second sides of the bottom plate and the compression skirt near the fourth sides of the bottom plate and the compression skirt.

19. The clamping system of claim 12 wherein the first upper latch assembly is positioned on the first sides of the bottom plate and the compression skirt near the fourth sides of the bottom plate and the compression skirt, and the second upper latch assembly is positioned on the second sides of the bottom plate and the compression skirt near the third sides of the bottom plate and the compression skirt.

20. The clamping system of claim 12 wherein the first lower latch assembly is positioned on the first sides of the bottom plate and the compression skirt near the third sides of the bottom plate and the compression skirt, the second lower latch assembly is positioned on the second sides of the bottom plate and the compression skirt near the fourth sides of the bottom plate and the compression skirt, the first upper latch assembly is positioned on the first sides of the bottom plate and the compression skirt near the fourth sides of the bottom plate and the compression skirt, and the second upper latch assembly is positioned on the second sides of the bottom plate and the compression skirt near the third sides of the bottom plate and the compression skirt.

21. The clamping system of claim 12 wherein the compression skirt has a support ledge for supporting a gasket.

22. The clamping system of claim 12 wherein the compression skirt has at least one alignment pin, and the cover plate has at least one receiving hole for receiving the alignment pin.

23. The clamping system of claim 12 wherein each of the latch assemblies is a rotary action latch assembly.

24. In combination with a reactor plate having a flange between an inlet section and an outlet section, a clamping system comprising:

a cover plate positioned adjacent the inlet section of the reactor plate;

a bottom plate having a base and a plurality of sides defining a well for receiving the outlet section and at least a portion of the flange of the reactor plate;

a compression skirt positioned between the cover plate and the bottom plate, the compression skirt also being disposed on at least a portion of the flange and around the inlet section of the reactor plate;

at least one upper latch assembly configured for clamping the cover plate onto the compression skirt; and at least one lower latch assembly configured for clamping the reactor plate between the compression skirt and the bottom plate.

25. The clamping system of claim 24 wherein the bottom plate has a support ledge for supporting the flange of the reactor plate.

26. The clamping system of claim 24 further comprising a gasket positioned in the well between the base of the bottom plate and the outlet section of the reactor plate.

27. The clamping system of claim 24 wherein the cover plate has an underside with at least one step.

28. The clamping system of claim 27 wherein the underside includes a first step, a second step positioned on the first step, and a third step positioned on the second step.

29. The clamping system of claim 24 further comprising a gasket positioned between the cover plate and the inlet section of the reactor plate.

30. The clamping system of claim 24 further comprising a first gasket positioned between the cover plate and the inlet section of the reactor plate, and a second gasket positioned in the well between the base of the bottom plate and the outlet section of the reactor plate.

31. The clamping system of claim 24 wherein the compression skirt has a support ledge for supporting a gasket.

32. The clamping system of claim 24 wherein the compression skirt has at least one alignment pin, and the cover plate has at least one receiving hole for receiving the alignment pin.

33. The clamping system of claim 24 wherein at least one of the latch assemblies is a rotary action latch assembly.

\* \* \* \* \*